United States Patent
Sugama et al.

(10) Patent No.: US 12,083,573 B2
(45) Date of Patent: Sep. 10, 2024

(54) TUBULAR ROTARY COMPONENT, MANUFACTURING METHOD THEREFOR, AND MOLD THEREFOR

(71) Applicant: NIPPON STEEL CORPORATION, Tokyo (JP)

(72) Inventors: Atsushi Sugama, Tokyo (JP); Takatsugu Kitora, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 372 days.

(21) Appl. No.: 17/426,912

(22) PCT Filed: Jul. 18, 2019

(86) PCT No.: PCT/JP2019/028297
§ 371 (c)(1),
(2) Date: Jul. 29, 2021

(87) PCT Pub. No.: WO2020/158010
PCT Pub. Date: Aug. 6, 2020

(65) Prior Publication Data
US 2022/0097118 A1 Mar. 31, 2022

(30) Foreign Application Priority Data
Jan. 30, 2019 (JP) .................................. 2019-014591

(51) Int. Cl.
*B21D 31/00* (2006.01)
*B21D 22/02* (2006.01)
(Continued)

(52) U.S. Cl.
CPC ........... *B21D 31/005* (2013.01); *B21D 24/00* (2013.01); *B21D 24/005* (2013.01); *B21D 53/10* (2013.01); *C21D 9/40* (2013.01)

(58) Field of Classification Search
CPC .... B21D 31/005; B21D 24/00; B21D 24/005; B21D 53/10; B21D 53/16; B21D 53/53;
(Continued)

(56) References Cited

U.S. PATENT DOCUMENTS 2,611,475 A * 9/1952 Slater ..................... B21D 22/21
72/347
2008/0089631 A1* 4/2008 Kobayashi .............. F16C 33/64
72/354.2
(Continued)

FOREIGN PATENT DOCUMENTS

| CN | 103909148 A | 7/2014 |
| CN | 103909148 B * | 4/2016 |

(Continued)

OTHER PUBLICATIONS

English translate (CN103909148B), retrieved date Nov. 29, 2023.*
(Continued)

*Primary Examiner* — Mohammed S. Alawadi
(74) *Attorney, Agent, or Firm* — Birch, Stewart, Kolasch & Birch, LLP

(57) ABSTRACT

Provided is a method for manufacturing a tubular rotary component from a donut-shaped metal disc, wherein the generation of wrinkles or cracks due to a drawing process can be suppressed. This method for manufacturing a tubular rotary component 100B includes: an intermediate molding step in which the entirety of both surfaces of a donut-shaped metal disc 100 having a prescribed inner diameter $D_1$ and outer diameter $D_2$ are pressed by the respective tapered surfaces of a punch 10A and a die 20A provided with a prescribed taper to carry out bore-expansion drawing, thereby obtaining a frustoconical intermediate molded article 100A; and a final molding step in which the intermediate molded article 100A is pressed by a punch 10B and a die 20B having a desired shape to carry out bore-expansion
(Continued)

drawing again, thereby obtaining a tubular rotary component 100B.

6 Claims, 19 Drawing Sheets

(51) Int. Cl.
*B21D 24/00* (2006.01)
*B21D 37/08* (2006.01)
*B21D 51/10* (2006.01)
*B21D 53/10* (2006.01)
*B21D 53/16* (2006.01)
*B21K 1/04* (2006.01)
*B23P 15/00* (2006.01)
*C21D 9/08* (2006.01)
*C21D 9/32* (2006.01)
*C21D 9/40* (2006.01)
*F16C 33/64* (2006.01)

(58) Field of Classification Search
CPC ........ B21D 37/08; B21D 22/02; B21D 22/21; B21D 51/10; B21K 1/24; B21K 1/761
See application file for complete search history.

(56) References Cited

U.S. PATENT DOCUMENTS

| | | |
|---|---|---|
| 2010/0172606 A1 | 7/2010 | Lunz et al. |
| 2014/0068947 A1 | 3/2014 | Mantau et al. |
| 2016/0121439 A1 | 5/2016 | Ishiki et al. |

FOREIGN PATENT DOCUMENTS

| | | |
|---|---|---|
| JP | 7-155877 A | 6/1995 |
| JP | 10-146642 A | 6/1998 |
| JP | 2006-123003 A | 5/2006 |
| JP | 2007-130673 A | 5/2007 |
| JP | 2009-226422 A | 10/2009 |
| JP | 2012/214892 A | 11/2012 |
| JP | 2014-233735 A | 12/2014 |

OTHER PUBLICATIONS

Japanese Notice of Reasons for Rejection, issued in Priority Application No. 2019-014591, mailed Aug. 13, 2019.
Japanese Notice of Reasons for Rejection, issued in Priority Application No. 2019-014591, mailed Sep. 24, 2019.
Chinese Office Action and Search Report for corresponding Chinese Application No. 201980089712.6. dated Oct. 10, 2022, with an English translation.
Wang, "A comprehensive manual for the design of technical molds," Washer Polytechnic University Press, Jun. 1995, p. 108, 6 pages total.

* cited by examiner (a)  (b)

(a)  (b)

(a)            (b)

(a)            (b)

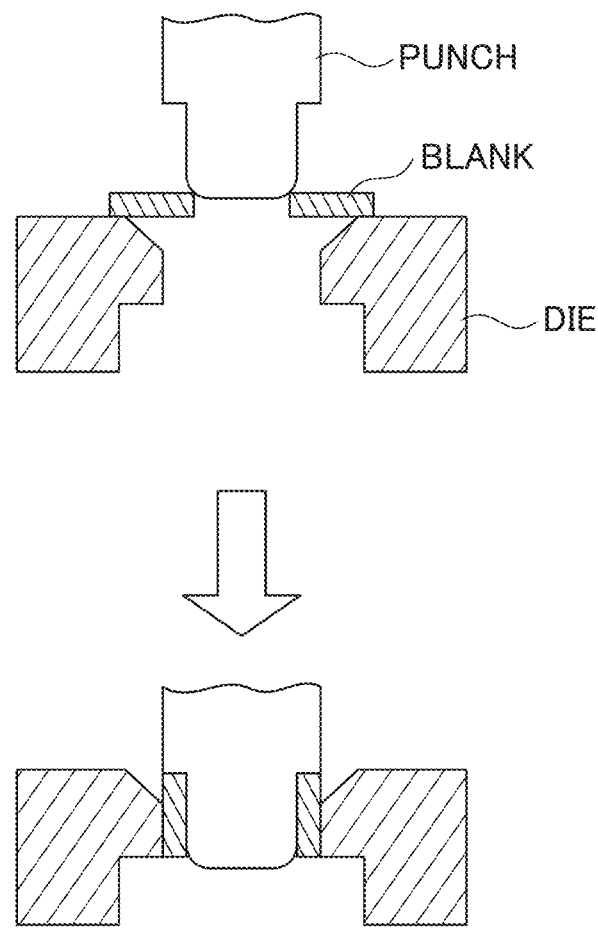

TUBULAR ROTARY COMPONENT, MANUFACTURING METHOD THEREFOR, AND MOLD THEREFOR

TECHNICAL FIELD

The present invention relates to a tubular rotary component made from a metal plate as a material, a method and a mold for manufacturing such a tubular rotary component. In particular, the present invention relates to a tubular rotary component that is made from a rolled steel plate as a material, and is for use as a bearing ring of a rolling bearing, a bearing ring for a roller, and a gear component.

BACKGROUND ART

Today, many of rotary components having a tubular shape, such as rolling bearings, rollers, and gear components, are made from seamless steel tubes that are produced from round bars of special steel (Patent Document 1).

Such a round bar of special steel as a material for the seamless steel tube contains inclusions, such as $Al_2O_3$, MnS, and TiN, that are unevenly distributed. The quantity of the inclusions increases toward the center and reaches a maximum at a central portion. The seamless steel tube is formed by piercing and reaming a central hole of the round bar by the Mannesmann piercing method. Therefore, the quantity of inclusions reaches a maximum near an inner peripheral portion of the steel tube, and decreases toward the outer periphery.

The inclusions may serve as a starting point of a fatigue fracture. It is known that if a large quantity of inclusions is present in or near a surface layer of a slidable component, fatigue characteristics of the slidable component (and rolling fatigue characteristics in the case of a rotary component) are deteriorated significantly (see Patent Document 2). Therefore, in the case of producing a tubular rotary component from a seamless steel tube as a material, to obtain desired fatigue characteristics, it is necessary to subject the tubular rotary component to machining. For example, the tubular rotary component needs to be cut in a direction from the inner periphery to the outer periphery to the extent that the inclusions exert a small effect. As a result, material yield decreases.

To address this problem, a method for manufacturing a tubular rotary component with satisfactorily material yield is disclosed. According to this method, a doughnut-shaped disc made of a steel plate as a material and having a hole in a central portion is subjected to a drawing process to be molded into a tubular rotary component (see Patent Documents 3 and 4).

A quantity of the above-mentioned inclusions increases toward the midpoint of a plate thickness of a steel plate and reaches a maximum near the midpoint of the plate thickness. Therefore, in the case of producing a tubular rotary component from a steel plate as a material, it is unnecessary to cut an inner peripheral portion of the tubular rotary component for the purpose of removing the inclusions, unlike the case of a tubular rotary component made from a seamless steel tube. As a result, it is possible to increase the material yield.

Patent Document 1: Japanese Unexamined Patent Application, Publication No. 2007-130673
Patent Document 2: Japanese Unexamined Patent Application, Publication No. 2012-214892
Patent Document 3: Japanese Unexamined Patent Application, Publication No. H07-155877
Patent Document 4: Japanese Unexamined Patent Application, Publication No. 2009-226422

DISCLOSURE OF THE INVENTION

Problems to be Solved by the Invention

As illustrated in FIG. 16A, according to the method for manufacturing a tubular structure disclosed in Patent Document 3, while the rim of a doughnut-shaped plate material is held with a holding plate, the hole of the plate material is reamed with a punch. Accordingly, as illustrated in (a) in FIG. 16B, the holding plate inhibits the plate material from flowing in the direction in which the punch is moved, so that a tensile force is generated and causes cracks (see (b) in FIG. 16B). As illustrated in (a) in FIG. 16C, since the die has a bend at its shoulder, an outer periphery line 1 (the length of which increases in a bending process) of the plate material becomes different from a neutral axis line $l_0$ (the length of which remains unchanged before and after the bending process), and the resultant line length difference Δ given by $l-l_0$ may cause cracks (see (b) in FIG. 16C). The tendency of cracks occurring becomes notable as the plate thickness increases.

To address this problem, it is possible to employ the method for manufacturing a tubular structure disclosed in Patent Document 4 (see FIG. 17A), according to which the holding plate is not used. In this case, as illustrated in FIG. 17B, wrinkles may form on the metal disc and the metal disc may be caught in the mold due to the wrinkles. This may generate a tensile force, and consequently, a crack may be caused.

Therefore, it is an object of the present invention to provide a method and a mold for manufacturing a tubular rotary component from a doughnut-shaped metal disc while reducing occurrence of wrinkles and cracks due to a drawing process, and to provide such a tubular rotary component.

Means for Solving the Problems

The present invention relates to a method for manufacturing a tubular rotary component from a metal disc with a hole formed in a central portion thereof, the metal disc having a predetermined inside diameter and a predetermined outside diameter. The method includes: an intermediate molding step including subjecting the metal disc to a reaming-drawing process in which both surfaces of the metal disc are pressed in entirety by a tapered surface of a punch having a predetermined taper and a tapered surface of a die having a predetermined taper, thereby producing an intermediate molded article having a frustoconical shape; and a final molding step including subjecting the intermediate molded article to a further reaming-drawing process in which the intermediate molded article is pressed by a punch and a die having a smaller taper angle than the punch and the die for use in the intermediate molding step, respectively, thereby manufacturing the tubular rotary component.

The processes are preferably performed under a condition that a stretch flange rate λ is 90% or less, the stretch flange rate λ being given by $\lambda=(D_1'-D_1)/D_1\times100$ where $D_1$ represents the inside diameter of the metal disc before undergoing the processes, and $D_1'$ represents an inside diameter of the tubular rotary component manufactured through the final molding step.

In the intermediate molding step, an angle formed between the tapered surface of the punch and a processing direction and an angle formed between the tapered surface of the die and the processing direction are preferably each set to 30 degrees or greater.

In the intermediate molding step, the reaming-drawing process is preferably performed two or more times while an angle between the tapered surface of the punch and a processing direction and an angle between the tapered surface of the die and the processing direction are varied.

The metal disc is preferably made of a metal plate as a material, the metal plate containing inclusions that are unevenly distributed such that a quantity of the inclusions increases toward a midpoint of a plate thickness of the metal plate. Preferably, the method further includes a cutting process step including subjecting the tubular rotary component obtained through the final molding step to a cutting process. The tubular rotary component has a thickness in which a partial thickness from a midpoint of the thickness to an inside diameter-side surface of the tubular rotary component is defined as an inside diameter-side thickness, while a partial thickness from the midpoint of the thickness to an outside diameter-side surface of the tubular rotary component is defined as an outside diameter-side thickness. The cutting process is preferably performed such that an inside diameter-side residue ratio becomes 0.37 or greater and an outside diameter-side residue ratio becomes 0.49 or greater, the inside diameter-side residue ratio being a ratio of the inside diameter-side thickness after the cutting process to the inside diameter-side thickness before the cutting process, and the outside diameter-side residue ratio being a ratio of the outside diameter-side thickness after the cutting process to the outside diameter-side thickness before the cutting process.

Preferably, the method further includes a heat treatment step including subjecting the tubular rotary component obtained through the final molding step to hardening and tempering.

The present invention further relates to a mold for use in the method described above. The mold includes: a punch with a predetermined taper and a die with a predetermined taper that are for use in the intermediate molding step; and a punch and a die that have a smaller taper angle than the punch and the die for use in the intermediate molding step, respectively.

The present invention relates to a tubular rotary component manufactured by the method described above. The tubular rotary component has a thickness in which a partial thickness from a midpoint of the thickness to an inside diameter-side surface of the tubular rotary component is defined as an inside diameter-side thickness, while a partial thickness from the midpoint of the thickness to an outside diameter-side surface of the tubular rotary component is defined as the outside diameter-side thickness. An inside diameter-side residue ratio is 0.37 or greater and an outside diameter-side residue ratio is 0.49 or greater, the inside diameter-side residue ratio being a ratio of the inside diameter-side thickness after the cutting process to the inside diameter-side thickness before the cutting process, and the outside diameter-side residue ratio being a ratio of the outside diameter-side thickness after the cutting process to the outside diameter-side thickness before the cutting process.

The present invention further relates to a tubular rotary component having a distribution of inclusions in a plate thickness of the tubular rotary component. When a quantity of the inclusions present in an inside diameter-side surface layer is defined as d (inside diameter) and a quantity of the inclusions present at a midpoint of the plate thickness is defined as d (plate thickness midpoint), the distribution satisfies a relationship expressed as d (plate thickness midpoint)>d (inside diameter).

The inclusions may contain at least one selected from the group consisting of $MnS$, $SiO_2$, $Al_2O_3$, and $TiN$.

Effects of the Invention

The manufacturing method of the present invention, which includes the intermediate molding step including subjecting the metal disc to a drawing process in which both surfaces of the metal disc are pressed in entirety by the tapered surface of the punch and the tapered surface of the die, makes it possible to reduce occurrence of wrinkles and cracks. The manufacturing method of the present invention can manufacture a tubular rotary component having a desired shape through the final molding step.

BRIEF DESCRIPTION OF THE DRAWINGS

FIG. 17A illustrates the manufacturing method disclosed in Patent Document 2.

PREFERRED MODE FOR CARRYING OUT THE INVENTION

Preferred embodiments of a method and a device for manufacturing a tubular rotary component of the present invention will be described with reference to the drawings. The tubular rotary component of the present invention is for use as a bearing ring of a rolling bearing, a bearing ring for a roller, and a gear component, and is required to have superior rolling fatigue characteristics.

EMBODIMENT

Figure 1:
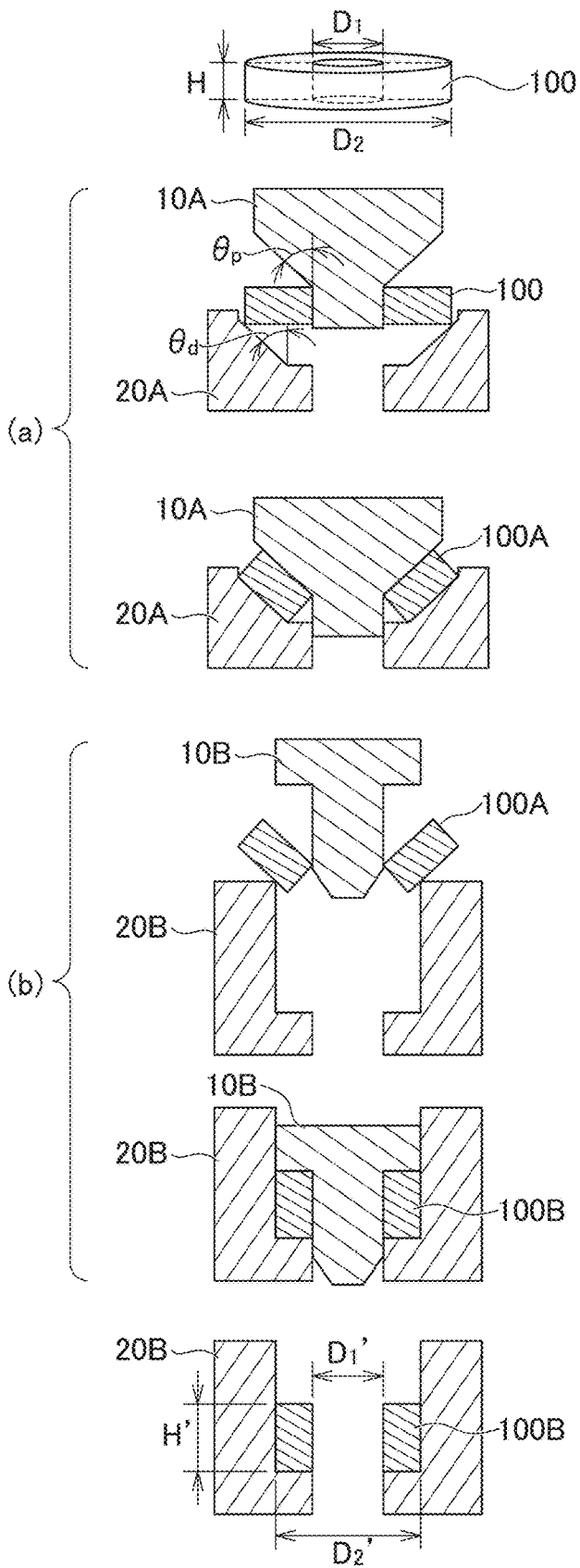
FIG. 1 illustrates steps of a method for manufacturing a tubular rotary component according to an embodiment of the present invention.

FIG. 1 illustrates steps included in the method for manufacturing the tubular rotary component according to the present embodiment. According to the method of the present embodiment, a doughnut-shaped metal disc 100 having a predetermined inside diameter $D_1$, a predetermined outside diameter $D_2$, a predetermined plate thickness H, and a hole formed in a central portion is molded by a reaming-drawing process. The reaming-drawing process of the present embodiment is a molding process for molding a metal plate having a hole formed in a central portion thereof into a tubular rotary component, by concurrently subjecting an outer peripheral portion and an inner peripheral portion of the metal plate to shrink flange deformation and stretch flange deformation, respectively.

The shape of the metal disc 100 can be suitably determined by setting the inside diameter $D_1$, the outside diameter $D_2$, and the plate thickness H from a volume of a desired tubular rotary component 100B having a final shape.

Examples of a material for the metal disc 100 include metal plates such as a rolled steel plate. A rolled steel plate contains inclusions that are unevenly distributed in such a manner that a quantity of the inclusions increases toward a midpoint of the plate thickness of the rolled steel plate. Therefore, superior rolling fatigue characteristics can be obtained by way of a drawing process performed on the rolled steel plate so that a surface of the rolled steel plate is formed into a load-bearing surface. In this way, sufficient rolling fatigue characteristics can be obtained without using a rolled steel plate having a high index of cleanliness.

Figure 16A:
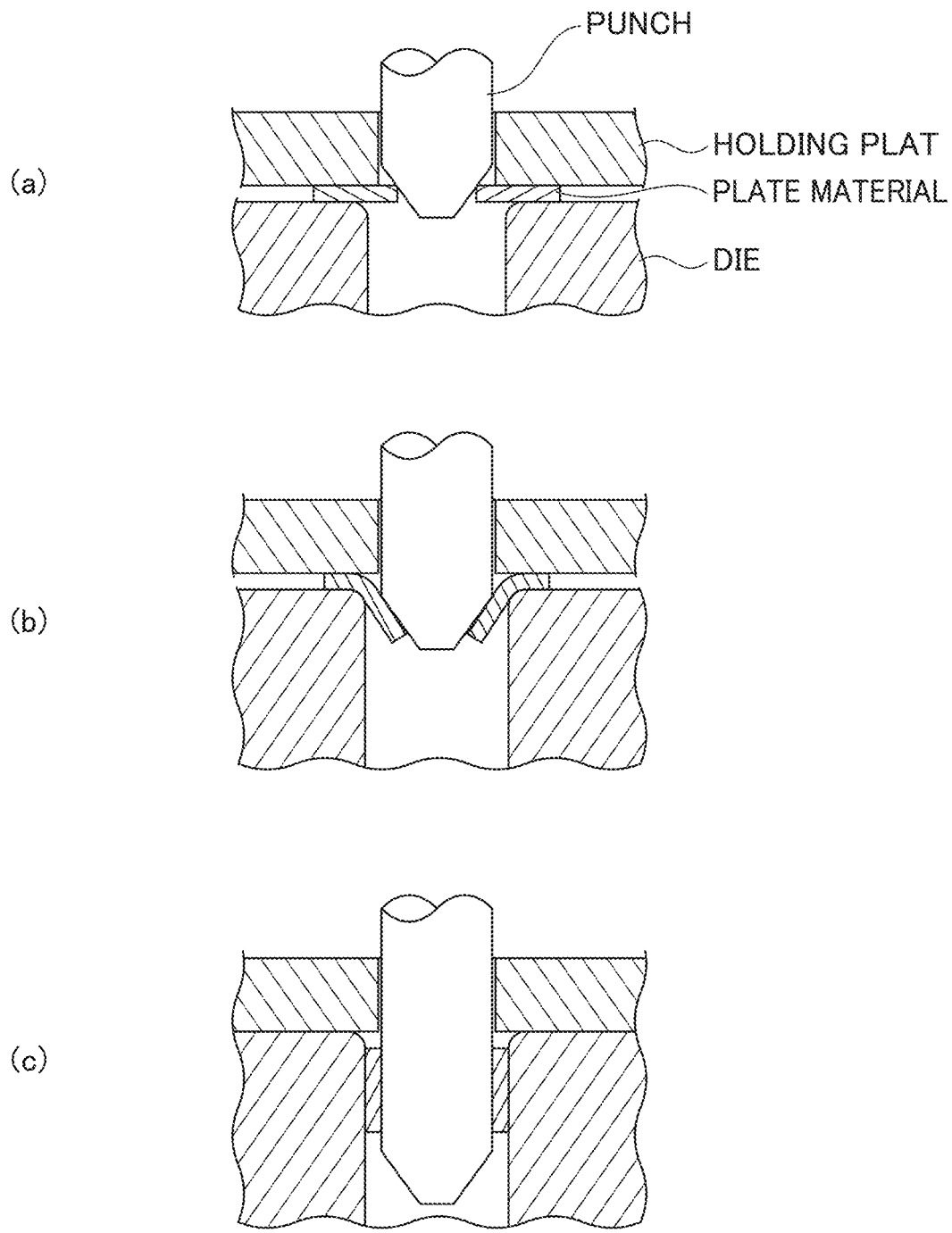
FIG. 16A illustrates the manufacturing method disclosed in Patent Document 1.
Figure 17B:
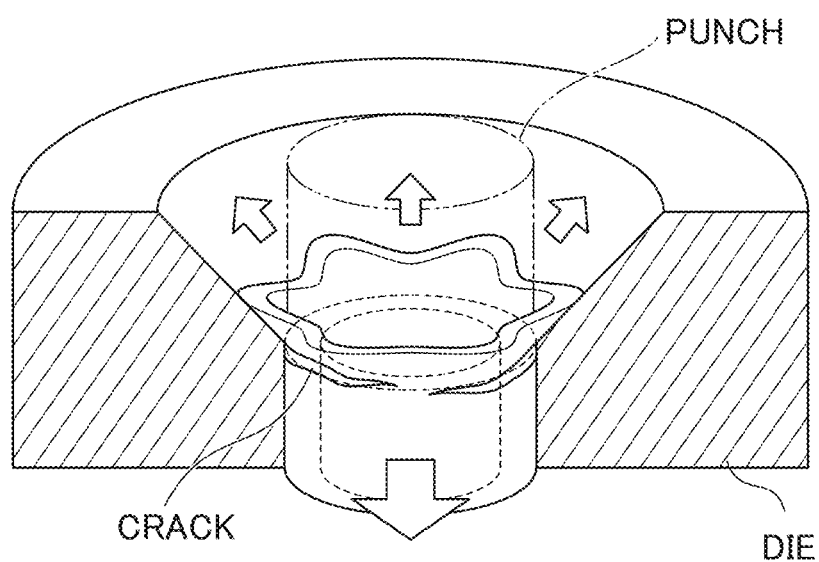
FIG. 17B illustrates a crack caused by wrinkles generated in the manufacturing method of FIG. 17A.

As illustrated in FIG. 1, the manufacturing method according to the present embodiment includes steps that are roughly grouped into (a) an intermediate molding step and (b) a final molding step. According to the known art, only one type of mold is used to perform a reaming-drawing process on a metal disc to mold the metal disc into a desired shape (see FIGS. 16A and 17A). In contrast, the manufacturing method according to the present embodiment uses two different types of molds, so that a frustoconical intermediate molded article 100A that is different in shape from a desired final shape is produced in the intermediate molding step, and thereafter, the intermediate molded article 100A undergoes a further reaming-drawing process in the final molding step. As a result, a tubular rotary component having the desired shape is molded.

Figure 16B:
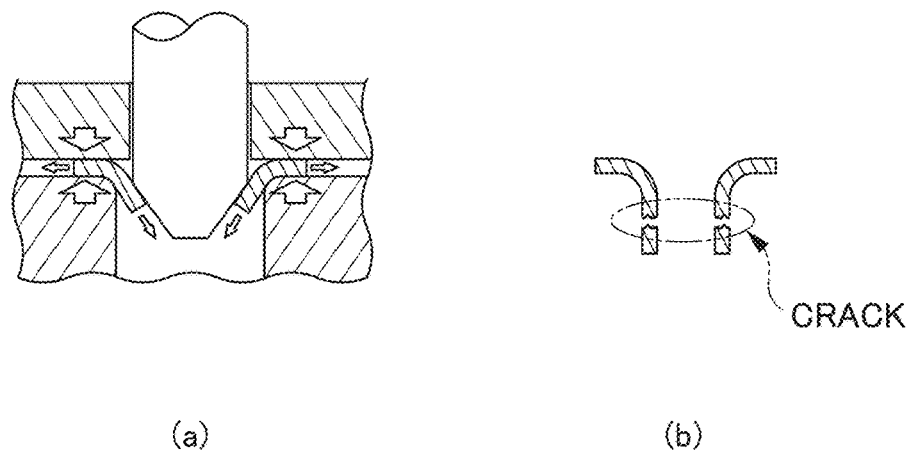
FIG. 16B illustrates a crack caused by a tensile force generated in the manufacturing method of FIG. 16A.
Figure 16C:
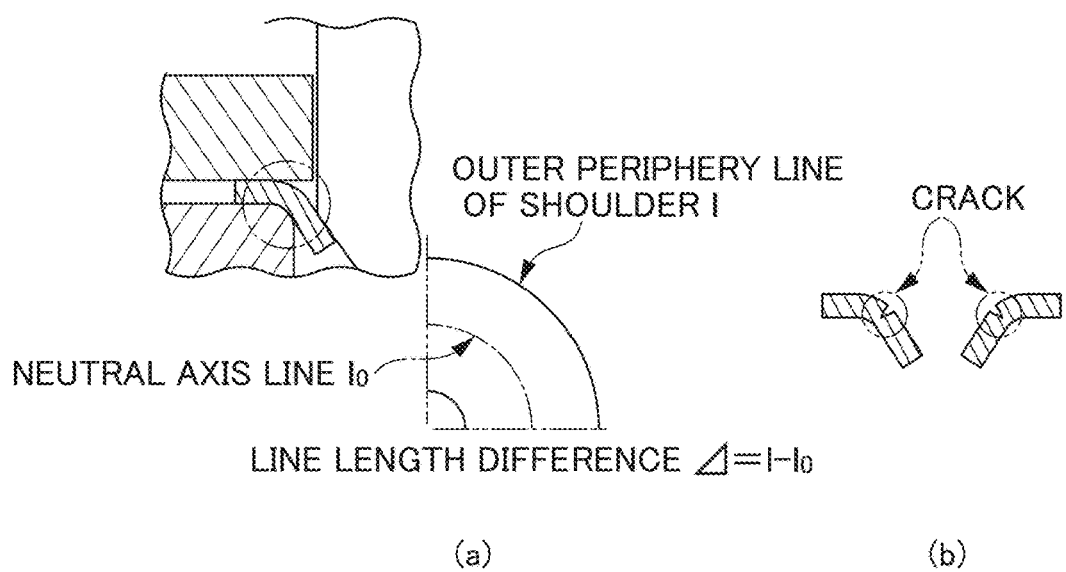
FIG. 16C illustrates a crack caused by a bend occurring in the manufacturing method of FIG. 16A.

As illustrated in (a) in FIG. 1, the intermediate molding step is carried out using a mold including a punch 10A with a predetermined taper and a die 20A with a predetermined taper that are for use in the intermediate molding step. The metal disc 100 is subjected to the reaming-drawing process in which both surfaces of the metal disc 100 are pressed in their entirety with the mold, so that the intermediate molded article 100A is produced. As can be seen, the tapered surface of the punch 10A and that of the die 20A sandwich therebetween both surfaces of the metal disc 100 in their entirety. This feature makes it possible to reduce occurrence of cracks that can be caused by tension and bending, in comparison with the conventional case where a metal disc is subjected to the drawing process while the rim of the metal disc is held with a holding plate (see FIG. 16B). Further, this feature can reduce occurrence of wrinkles and occurrence of cracks that can be caused by the wrinkles, in comparison with the conventional case (FIG. 17B) where a metal disc is subjected to the drawing process without using a holding plate for holding the rim of the metal disc.

The tapered surface of the punch 10A and that of the die 20A form an angle $\theta_p$ and an angle $\theta_d$ with a processing direction, respectively. In the present embodiment, the angles are set to satisfy the relationship expressed as $\theta_p = \theta_d$ in order to make the produced tubular rotary component have a uniform thickness.

Setting the angle $\theta_p$ of the punch 10A and the angle $\theta_d$ of the die 20A to 25 degrees or greater makes it possible to produce the intermediate molded article 100A while reducing occurrence of cracks. Setting the angles $\theta_p$ and $\theta_d$ to 30 degrees or greater makes it possible to produce the intermediate molded article 100A while reducing occurrence of minute wrinkles.

As illustrated in (b) in FIG. 1, the final molding step is carried out using a mold including a punch 10B and a die 20B that are for use in the final molding step and are configured to mold the tubular rotary component having a desired shape. The intermediate molded article 100A is subjected to a further drawing process using the mold, so that the tubular rotary component 100B is produced. The punch 10B and the die 20B for use in this step have taper angles ($\theta_p$ and $\theta_d$) smaller than those of the punch and the die for use in the intermediate molding step. In the present embodiment, to produce the tubular rotary component having an inside diameter $D_1'$ and an outside diameter $D_2'$, the punch 10B is designed to have a circular column shape with an outside diameter $D_1'$ while the die 20B is designed to have an annular shape with an inside diameter $D_2'$ (where angles $\theta_p$ and $\theta_d$ are both 0 degree).

Note that the "intermediate molding step" as used herein refers to subjecting the metal disc or the intermediate molded article to the reaming-drawing process, while both surfaces of the metal disc or the intermediate molded article are pressed in their entirety by the tapered surfaces. The "final molding step" as used herein refers to a step in which the intermediate molded article is subjected to the reaming-drawing process while both surfaces of the intermediate molded article are pressed in their entirety, but not by tapered surfaces.

Next, a stretch flange rate λ in the process in which the metal disc 100 is molded into the tubular rotary component 100B will be described.

Based on the inside diameter $D_1$ of the metal disc 100 before the reaming-drawing process and the inside diameter $D_1'$ of the tubular rotary component produced through the final molding step, the stretch flange rate λ is given by λ (%)=$(D_1'-D_1)D_1 \times 100$. If the inside diameter $D_1'$ resulting from the final molding step is excessively large with respect to the inside diameter $D_1$ before the reaming-drawing process, the risk of cracks arises. Therefore, it is preferable to set the shape of the metal disc 100 such that the stretch flange rate λ will be 90% or less.

The above-described method for manufacturing the tubular rotary component according to the present embodiment produces the following effects.

(1) The method is for manufacturing the tubular rotary component 100B from the doughnut-shaped metal disc 100 having the predetermined inside diameter $D_1$ and the predetermined outside diameter $D_2$. The method includes: the intermediate molding step including subjecting the metal disc 100 to the reaming-drawing process in which both surfaces of the metal disc 100 are pressed in their entirety by the tapered surfaces of the punch 10A with the predetermined taper and the die 20A with the predetermined taper, thereby producing the intermediate molded article 100A having a frustoconical shape; and the final molding step including subjecting the intermediate molded article 100A to the further reaming-drawing process in which the intermediate molded article 100A is pressed by the punch 10B and the die 20B that have a desired shape, thereby producing the tubular rotary component 100B. This feature makes it possible to mold the metal disc 100 into the tubular rotary component 100B, while reducing occurrence of cracks and wrinkles during the reaming-drawing processes. In the case of using a steel plate as the material for the metal disc, the tubular rotary component 100B can be made to have sufficient rolling fatigue characteristics.

(2) According to the manufacturing method of the present invention, the processes are carried out under the conditions that the stretch flange rate λ is 90% or less, the stretch flange rate λ being given by $\lambda=(D_1'-D_1)/D_1\times100$ where $D_1$ represents the inside diameter of the metal disc 100 before undergoing the processes and $D_1'$ represents the inside diameter of the tubular rotary component 100B produced through the final molding step. This feature makes it possible to produce the tubular rotary component 100B, while reducing occurrence of cracks.

(3) In the intermediate molding step, the angle $\theta_p$ formed between the tapered surface of the punch 10A and the processing direction and the angle $\theta_d$ formed between the tapered surface of the die 20A and the processing direction are each set to 30 degrees or greater. This feature makes it possible to produce the tubular rotary component 100B, while reducing occurrence of minute wrinkles.

Modifications

Next, a modification of the present embodiment will be described with reference to FIG. 2. This modification differs from the embodiment illustrated in FIG. 1 in that in the intermediate molding step of the modification, the reaming-drawing process is performed two or more times, while the angle between the tapered surface of the punch and the processing direction and the angle between the tapered surface of the die and the processing direction are varied. Dividing the intermediate molding step into two or more steps in this manner allows the reaming-drawing process to be performed further suitably.

Figure 2:
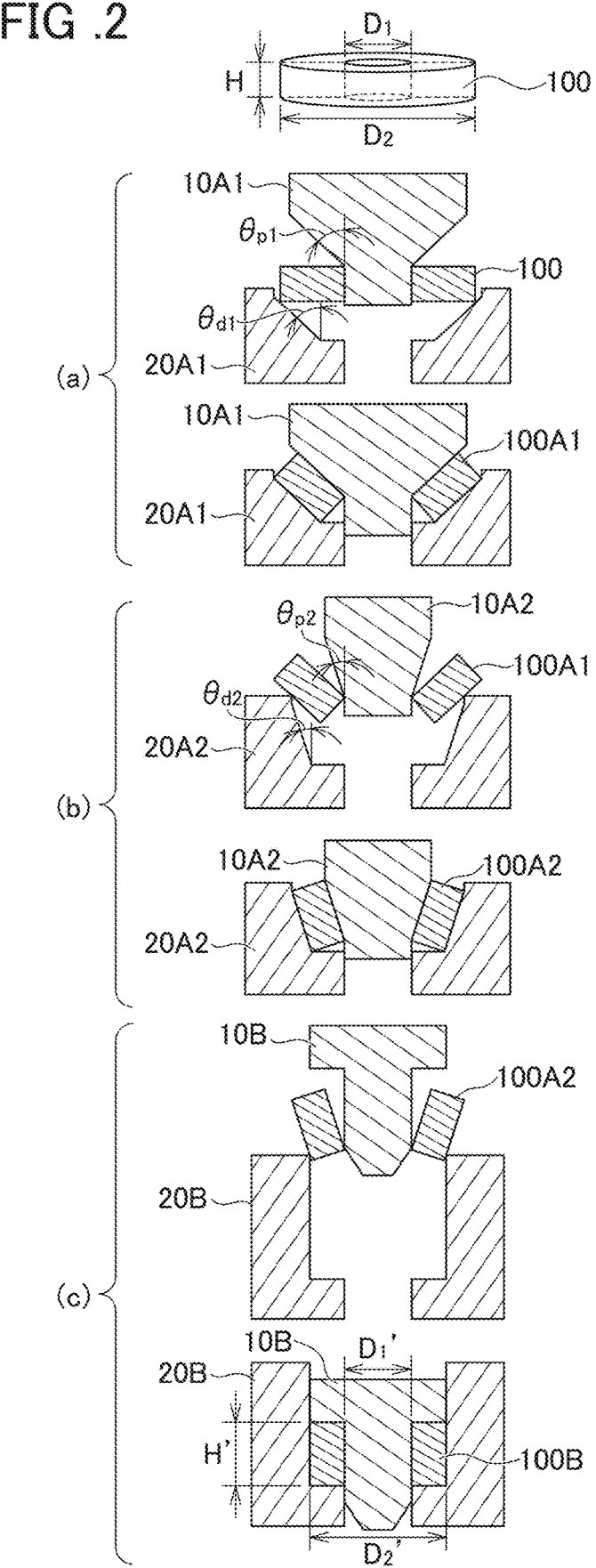
FIG. 2 illustrates steps of a method for manufacturing a tubular rotary component according to a modification of the embodiment of the present invention.
Figure 3:
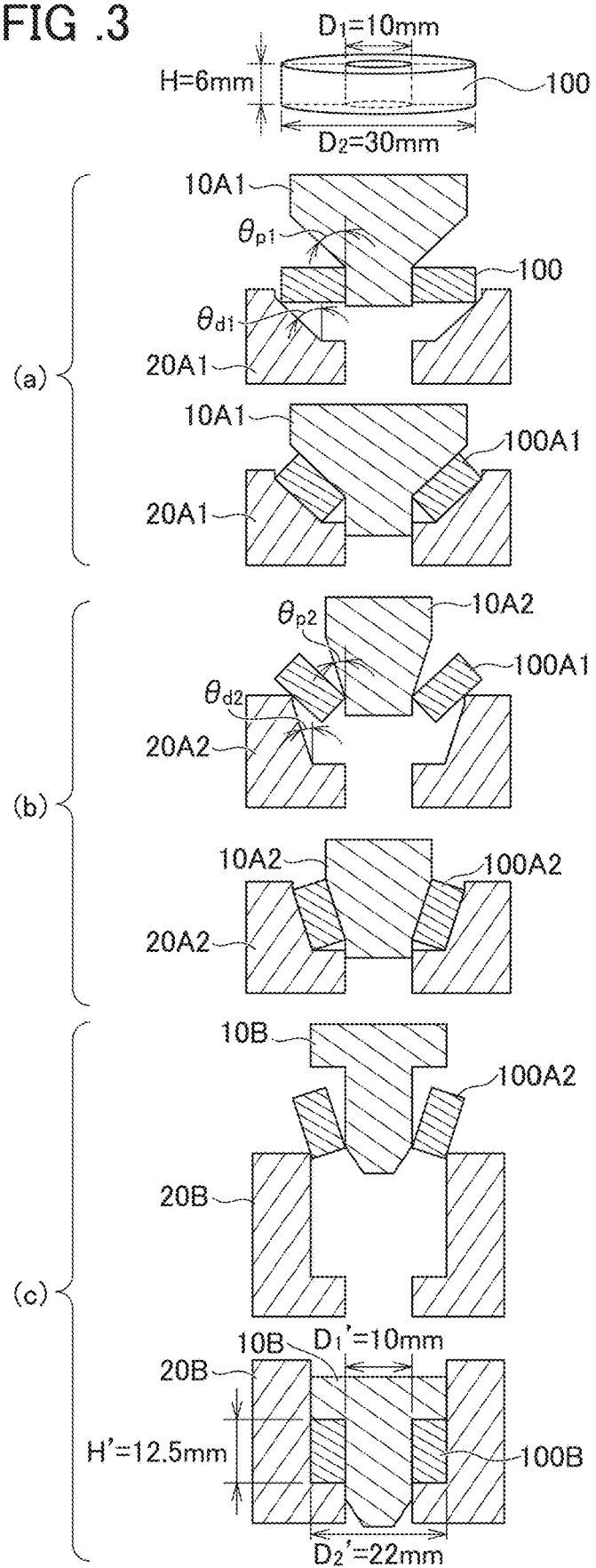
FIG. 3 illustrates Example 1 of the present invention.

As illustrated in (a) in FIG. 2, in the intermediate molding step, the metal disc 100 is subjected to a first reaming-drawing process in which both surfaces of the metal disc 100 are pressed in their entirety using a mold including a punch 10A1 with a predetermined taper and a die 20A1 with a predetermined taper, thereby producing an intermediate molded article 100A1.

A tapered surface of the punch 10A1 and that of the die 20A1 form an angle $\theta_{p1}$ and an angle $\theta_{d1}$ with a processing direction, respectively. In the present modification, the angles are set to satisfy a relationship expressed as $\theta_{p1}=\theta_{d1}$ in order to make the produced tubular rotary component have a uniform thickness.

As illustrated in (b) in FIG. 2, in the intermediate molding step, the intermediate molded article 100A1 is subjected to a second reaming-drawing process in which both surfaces of the intermediate molded article 100A1 are pressed in their entirety using a mold including a punch 10A2 with a predetermined taper and a die 20A2 with a predetermined taper, thereby producing an intermediate molded article 100A2.

A tapered surface of the punch 10A2 and that of the die 20A2 form an angle $\theta_{p2}$ and an angle $\theta_{d2}$ with the processing direction, respectively. In the present modification, the angles are set to satisfy a relationship expressed as $\theta_{p2}=\theta_{d2}$ in order to make the produced tubular rotary component have a uniform thickness. The angles $\theta_{p2}$ and $\theta_{d2}$ formed between the processing direction and the tapered surfaces of the punch 10A2 and the die 20A2 for use in the second reaming-drawing process are smaller than the angles $\theta_{p1}$ and $\theta_{d1}$ formed between the processing direction and the tapered surfaces of the punch 10A1 and the die 20A1 for use in the first reaming-drawing process.

As illustrated in (c) in FIG. 2, in the final molding step, the intermediate molded article 100A2 is subjected to a further drawing process using a mold including a punch 10B and a die 20B that are configured to mold the tubular rotary component having a desired shape. As a result, a tubular rotary component 100B is produced. In the present embodiment, to produce the tubular rotary component having an inside diameter $D_1'$ and an outside diameter $D_2'$, the punch 10B is designed to have a circular column shape with an outside diameter $D_1'$ while the die 20B is designed to have an annular shape with an inside diameter $D_2'$.

The method for manufacturing the tubular rotary component according to the present modification produces the following effects.

(4) In the intermediate molding step, the reaming-drawing process is performed two or more times, while the angle between the tapered surface of the punch and the processing direction and the angle between the tapered surface of the die and the processing direction are varied. This feature makes it possible to carry out the intermediate molding step further suitably, in comparison with the case where the intermediate molding step includes performing the reaming-drawing process once.

EXAMPLES

Next, with reference to FIGS. 3 to 15B, Examples in which tubular rotary components 100B were produced by the manufacturing method of the present invention and Comparative Examples in which tubular rotary components were produced by the conventional methods will be described.

A SUJ2 steel plate having a plate thickness of 6 mm was used as the material for each metal disc 100. The reaming-drawing process of the intermediate molding step and that of the final molding step were performed under the drawing process conditions shown in Table 1.

TABLE 1

| Pressing Apparatus | Mechanical Press (product of AMADA CO., LTD.) |
|---|---|
| Machining Speed | 20 SPM |
| Lubricating Oil | G-3456 (product of Nihon Kohsakuyu Co., Ltd.) |

The tubular rotary components of the Examples and Comparative Examples were produced with different values of the stretch flange rate A. The tubular rotary components of Examples 1-1 to 1-3 were produced using the molds illustrated in FIG. 3 under the condition that λ=0%. The tubular rotary components of Examples 2-1 to 2-3 were produced using the molds illustrated in FIG. 5 under the condition that λ=85%. The tubular rotary component of Comparative Example 1 illustrated in FIG. 6 was produced under the condition that λ=100%.

The tubular rotary components of Examples 1-1' to 1-3' and Examples 2-1' to 2-3' were produced using the molds illustrated in FIG. 1. Examples 1-1' to 1-3' correspond to Examples 1-1 to 1-3, respectively. Examples 2-1' to 2-3' correspond to Examples 2-1 to 2-3, respectively.

Figure 4:
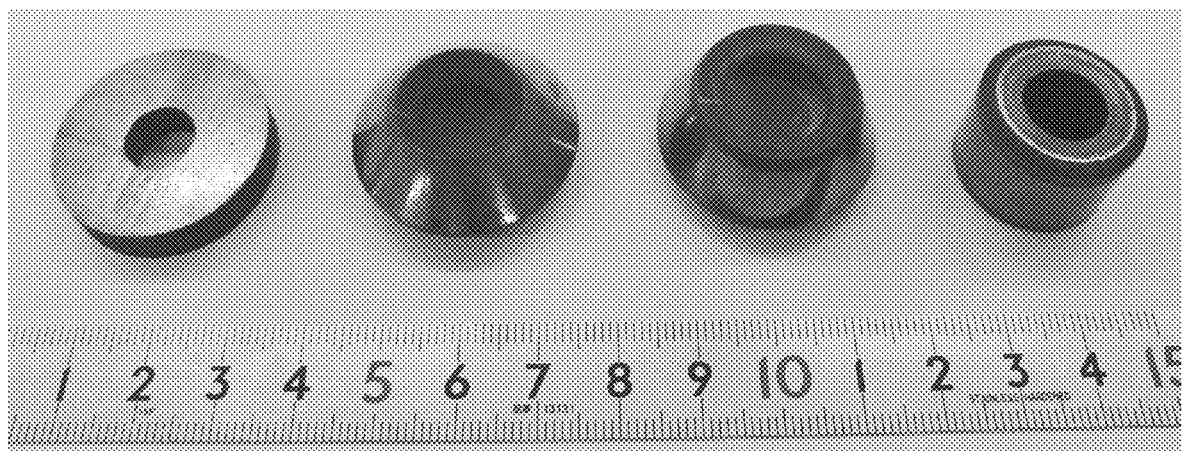
FIG. 4 is a photograph showing the external appearance of tubular rotary components produced in Example 1-1 of the present invention.
Figure 5:
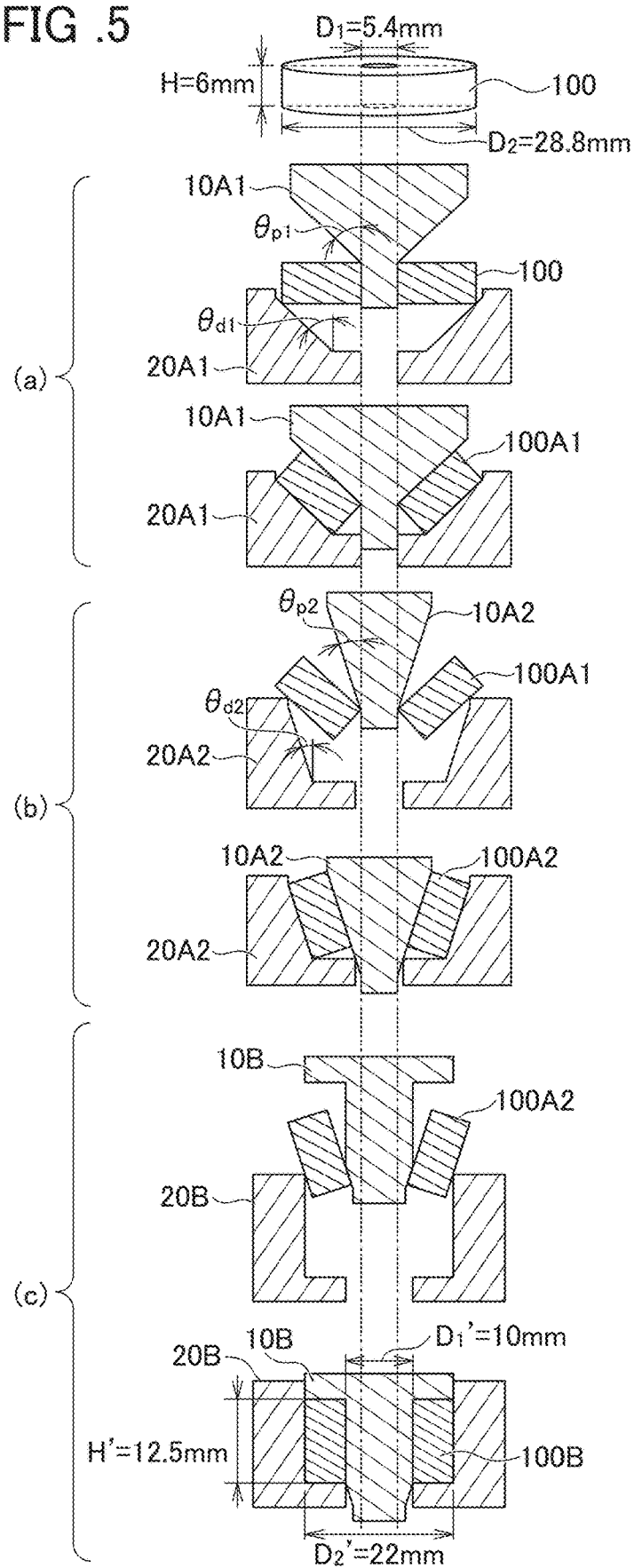
FIG. 5 illustrates Example 2 of the present invention.
Figure 6:
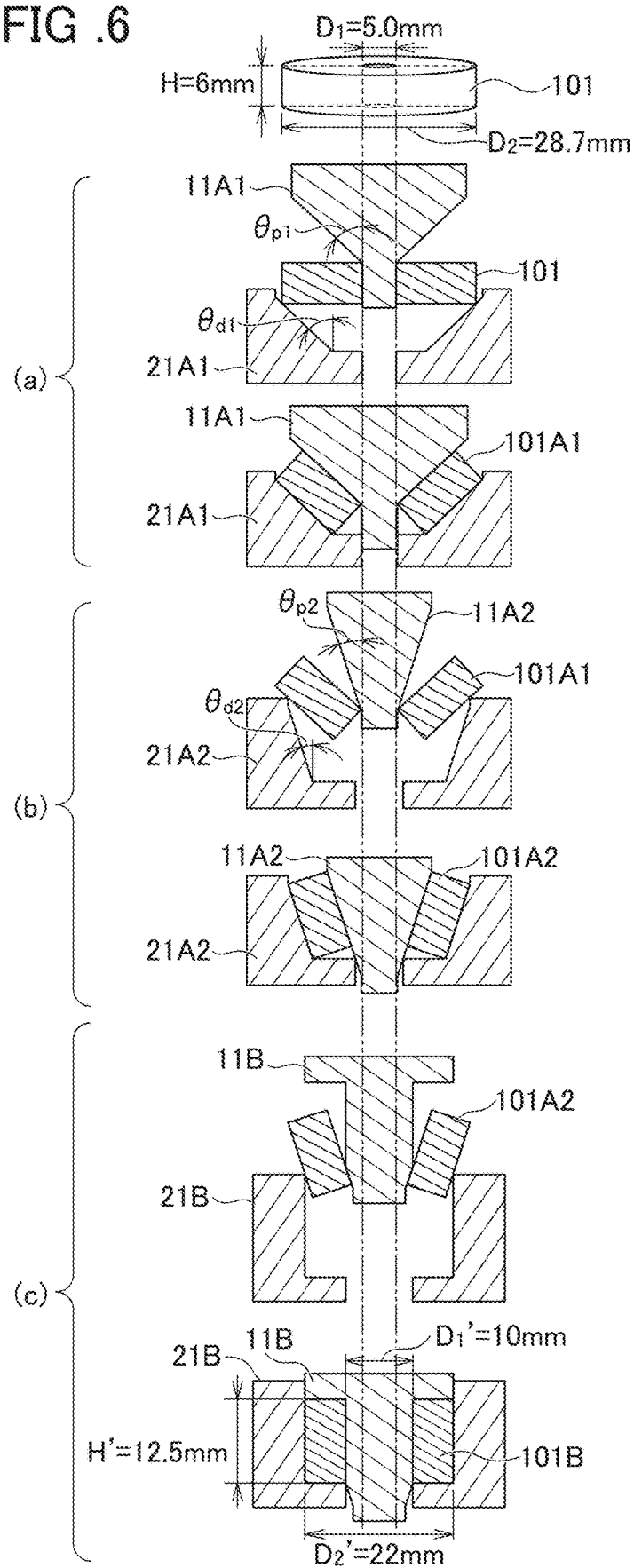
FIG. 6 illustrates Comparative Example 1 of the present invention.
Figure 7:
FIG. 7 is a photograph showing the external appearance of a tubular rotary component produced in Comparative Example 1 of the present invention.

FIG. 4 is a photograph showing the external appearance of the tubular rotary components of Example 1-1. FIG. 7 is a photograph showing the external appearance of the tubular rotary component of Comparative Example 1.

Figure 8:
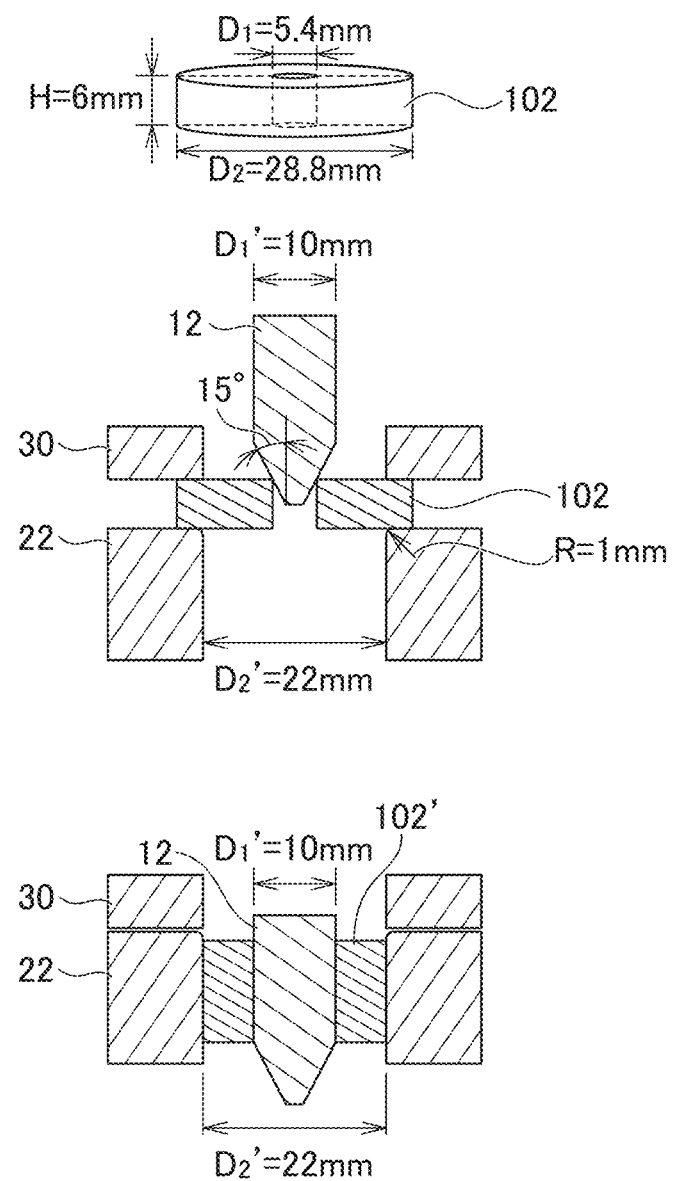
FIG. 8 illustrates Comparative Example 2-1 in which the mold disclosed in Patent Document 1 was used.
Figure 9:
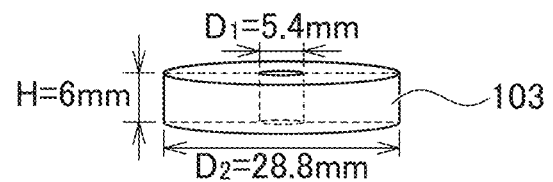
FIG. 9 illustrates Comparative Example 2-2 in which the mold disclosed in Patent Document 2 was used.
Figure 9:
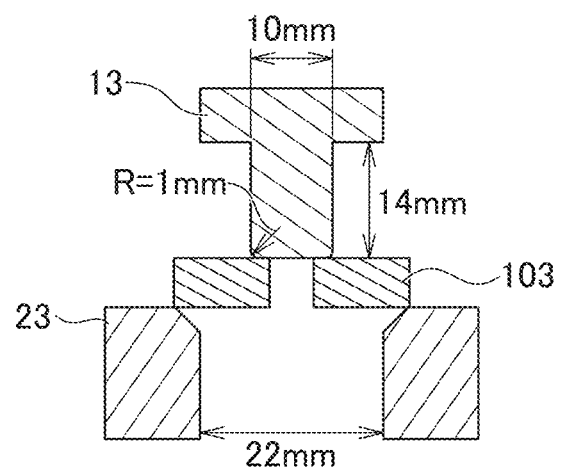
Figure 9:
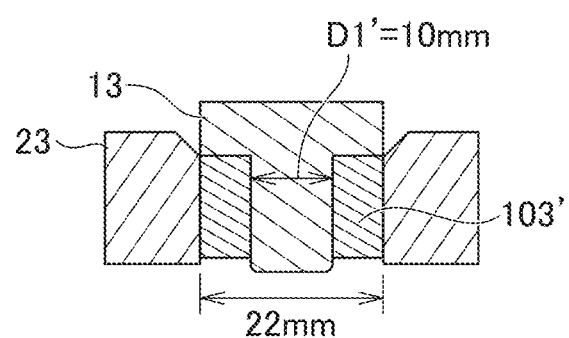

For the purpose of comparison with the conventional manufacturing methods, the tubular rotary component of Comparative Example 2 was produced using the mold disclosed in Patent Document 1, as illustrated in FIG. 8, and the tubular rotary component of Comparative Example 3 was produced using the mold disclosed in Patent Document 2, as illustrated in FIG. 9.

Table 2 shows the specifics of the shapes of the metal discs 100 used in Examples and Comparative Examples. Table 3 summarizes the results of the drawing process tests.

TABLE 2

| Inside Diameter $D_1$ (mm) | Outside Diameter $D_2$ (mm) | Thickness H (mm) | Remarks |
|---|---|---|---|
| 10.0 | 30.0 | 6.0 | Example 1 |
| 5.4 | 28.8 | 6.0 | Example 2 |
| | | | Comparative Examples 2, 3 |
| 5.0 | 28.7 | 6.0 | Comparative Example 1 |

TABLE 3

| | Stretch Flange Rate λ (%) | Intermediate Molding Step First $\theta_{p1}, \theta_{d1}$ (Degrees)/Evaluation | Intermediate Molding Step Second $\theta_{p2}, \theta_{d2}$ (Degrees)/Evaluation | Final Molding Step |
|---|---|---|---|---|
| Example 1-1 | 0 | 45/OK | 20/OK | OK |
| Example 1-1' | 0 | 45/OK | — | OK |
| Example 1-2 | 0 | 30/OK | 20/OK | OK |
| Example 1-2' | 0 | 30/OK | — | OK(Minute Wrinkle) |
| Example 1-3 | 0 | 25/OK(Minute Wrinkle) | 20/OK(Minute Wrinkle) | OK(Minute Wrinkle) |
| Example 1-3' | 0 | 25/OK(Minute Wrinkle) | — | OK(Minute Wrinkle) |
| Example 2-1 | 85 | 45/OK | 20/OK | OK |
| Example 2-1' | 85 | 45/OK | — | OK |
| Example 2-2 | 85 | 30/OK | 20/OK | OK |
| Example 2-2' | 85 | 30/OK | — | OK(Minute Wrinkle) |
| Example 2-3 | 85 | 25/OK(Minute Wrinkle) | 20/OK(Minute Wrinkle) | OK(Minute Wrinkle) |
| Example 1-3' | 85 | 25/OK(Minute Wrinkle) | — | OK(Minute Wrinkle) |
| Comparative Example 1 | 100 | 45/OK | 20/OK | NG(Crack) |
| Comparative Example 2-1 (Mold of Patent Document 1) | 85 | — | — | NG(Crack) |
| Comparative Example 2-2 (Mold of Patent Document 2) | 85 | — | — | NG(Crack) |

As shown in Table 3, a comparison between the stretch flange rates of Examples 1-1 to 2-3 and Comparative Example 1 demonstrates the following. Examples 1-1 to 2-3 of which the stretch flange rate λ was 90% or less allowed the reaming-drawing processes to be performed, with the absence of cracks, as shown in FIG. 4. Comparative Example 1 of which the stretch flange rate λ was 100% experienced a crack in the final molding step, as shown in FIG. 7. It was confirmed that if the first reaming-drawing process in the intermediate molding step is performed in a state where the angles $\theta_{p1}$ and $\theta_{d1}$ of the tapered surfaces are 25 degrees or greater, the drawing process can be performed suitably although minute wrinkles are observed after the final molding step. It was also confirmed that if the first reaming-drawing process is performed in a state where the angles $\theta_{p1}$ and $\theta_{d1}$ of the tapered surfaces are 30 degrees or greater, the drawing process can be performed without allowing minute wrinkles to form. The minute wrinkles can be eliminated by a cutting process performed in a later step, and do not affect the shape and strength of the finished products.

Regarding Examples 1-1' to 1-3' and Examples 2-1' to 2-3' in which the intermediate molding step is carried out once and is followed by the final molding step, it was confirmed that if the reaming-drawing process is performed in a state where the angles $\theta_{p1}$ and $\theta_{d1}$ of the tapered surfaces are 25 degrees or greater, the drawing process can be performed suitably although minute wrinkles are observed after the final molding step. It was also confirmed that if the reaming-drawing process is performed in a state where the angles $\theta_{p1}$ and $\theta_{d1}$ of the tapered surfaces are 40 degrees or greater, the reaming-drawing process can be performed without allowing minute wrinkles to form.

In Comparative Examples 2-1 and 2-2, the same metal discs 100 as those of Examples 2-1 to 2-3 were used. That is, under the same condition that the stretch flange rate λ is 85%, the reaming-drawing process of the final molding step was performed using the conventional mold, while the intermediate molding step was omitted. Comparative Examples 2-1 and 2-2 experienced cracks, making it impossible to produce tubular rotary components.

Next, with reference to a case where a tubular rotary component produced through the reaming-drawing process is subjected to a cutting process, an effect exerted on the rolling fatigue characteristics by a cutting volume will be described.

Figure 10:
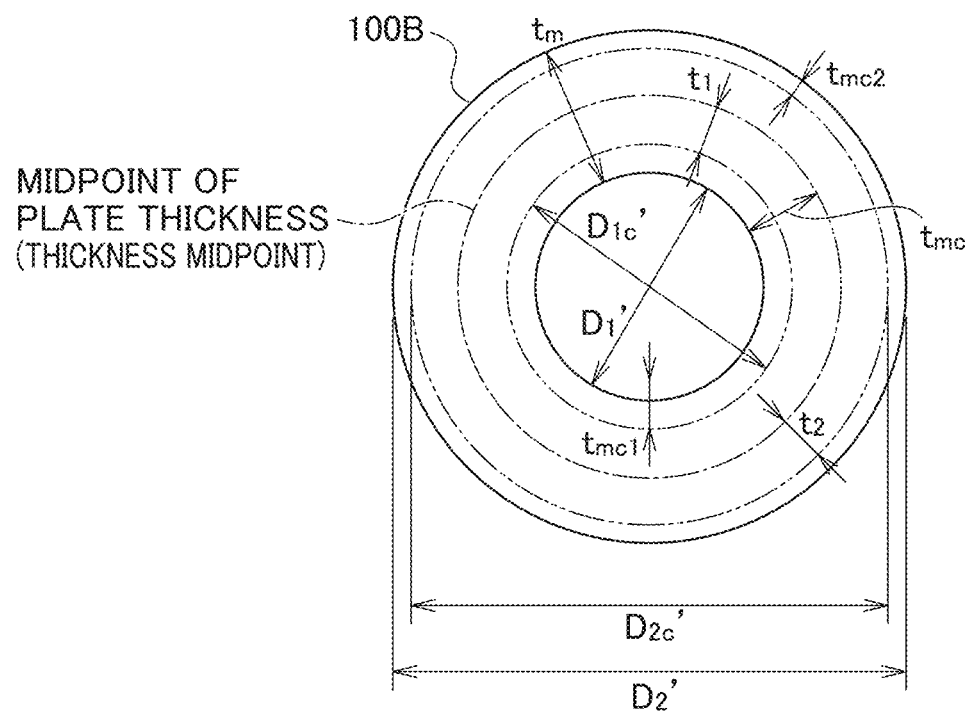
FIG. 10 illustrates a residual ratio of an inside diameter-side thickness and that of an outside diameter-side thickness.

With reference to FIG. 10, a residual ratio of an inside diameter-side thickness and that of an outside diameter-side thickness will be described. The residual ratio is an index indicating a volume cut off from an inner surface of the tubular rotary component or a volume cut off from an outer surface of the tubular rotary component.

FIG. 10 is a schematic diagram illustrating the tubular rotary component 100B that has been subjected to the reaming-drawing process, as viewed in an axial direction of the tubular shape. A plate thickness after the drawing process is denoted by $t_m$. A partial thickness to the midpoint of the plate thickness (thickness midpoint) is denoted by $t_{mc}$ ($t_{mc}=t_m/2$). An inside diameter after the drawing process is denoted by $D_1'$. An outside diameter after the drawing process is denoted by $D_2'$. An inside diameter after the cutting process is denoted by $D_{1c}'$. An outside diameter after the cutting process is denoted by $D_{2c}'$. Accordingly, an inside diameter-side cut thickness $t_{mc1}$ is expressed as $t_{mc1}=(D_{1c}'-D_1')/2$. An outside diameter-side cut thickness $t_{mc2}$ is expressed as $t_{mc2}=(D_2'-D_{2c}')/2$. Thus, an inside diameter-side partial thickness $t_1$ after the cutting process is expressed as $t_1=t_{mc}-t_{mc1}$, whereas an outside diameter-side partial thickness $t_2$ after the cutting process is expressed as $t_2=t_{mc}-t_{mc2}$. Hence, the residual ratio of the inside diameter-side thickness is given by $t_1/t_{mc}$, and the residual ratio of the outside diameter-side thickness is given by $t_2/t_{mc}$.

Figure 11:
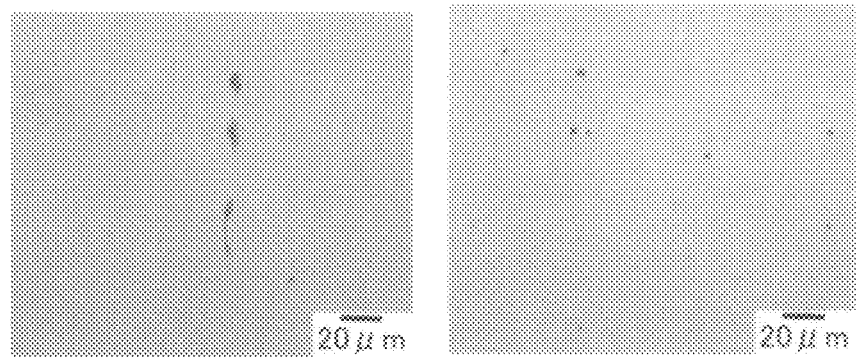
FIG. 11 shows optical micrographs of examples of inclusions.

FIG. 11 shows examples of inclusions present in the steel plate as the material for the metal disc 100, as observed with an optical microscope. In FIG. 11, blackish particles are the inclusions, such as $Al_2O_3$, MnS, and TiN.

In the case of the metal disc made of steel, the inclusions generally contain three types of inclusion: namely, A type inclusions, which have undergone viscous deformation due to a process; B type inclusions, which form groups of particles arranged discontinuously in the processing direction; and C type inclusions, which have not undergone viscous deformation and are irregularly dispersed. Known representative non-metallic inclusions of A type inclusions include, for example, MnS as a sulfide having an elongated shape and $SiO_2$ as silicate. Known representative non-metallic inclusions of B type inclusions include, for example, $Al_2O_3$. Known representative non-metallic inclusions of C type inclusions include, for example, oxide particles.

These non-metallic inclusions can be counted by microscopic observation in accordance with JIS G0555 "Microscopic testing method for the non-metallic inclusions in steel". For example, the number of inclusions can be counted in the following manner. A specimen is cut off from a target, polished to be provided with mirror finish without etching, and observed with an optical microscope at 400×.

Figure 12:
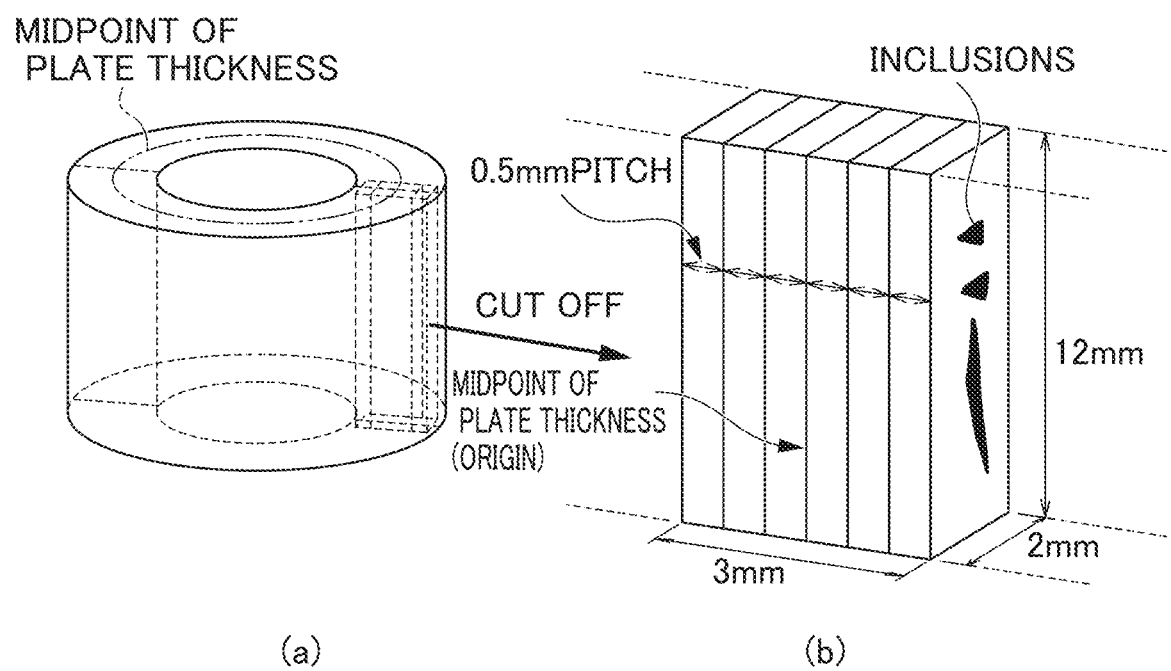
FIG. 12 illustrates a method for determining a quantity of inclusions.

Next, with reference to FIG. 12, a process for determining a quantity of inclusions present in the tubular rotary component will be described. As illustrated in (a) in FIG. 12, a cuboid portion in a size of 2 mm×12 mm×3 mm is cut from the tubular rotary component. The cuboid portion is then further cut into six pieces as illustrated in (b) in FIG. 12, thereby preparing six cuboid specimens in a size of 2 mm×12 mm×0.5 mm. At this time, the specimens are cut such that the boundary between the third and fourth specimens coincides with the midpoint of the plate thickness (thickness midpoint). While the midpoint of the plate thickness is defined as 0 mm, a measurement position located toward the inner surface with respect to the midpoint is denoted by a negative numeral and a measurement position located toward the outer surface with respect to the midpoint is denoted by a positive numeral. The inclusions appearing on a surface of the specimen are counted using an optical microscope.

The count is then converted to the number per area of 1 $mm^2$. The inclusions are counted on only one of the outer surface and the inner surface of each specimen. The number of the inclusions is divided by the area of the specimen, i.e., 2 mm×12 mm, whereby the number is converted to the number per area of 1 $mm^2$. In the present embodiment, the inclusions appearing on the outer surface of each specimen was counted.

Figure 13:
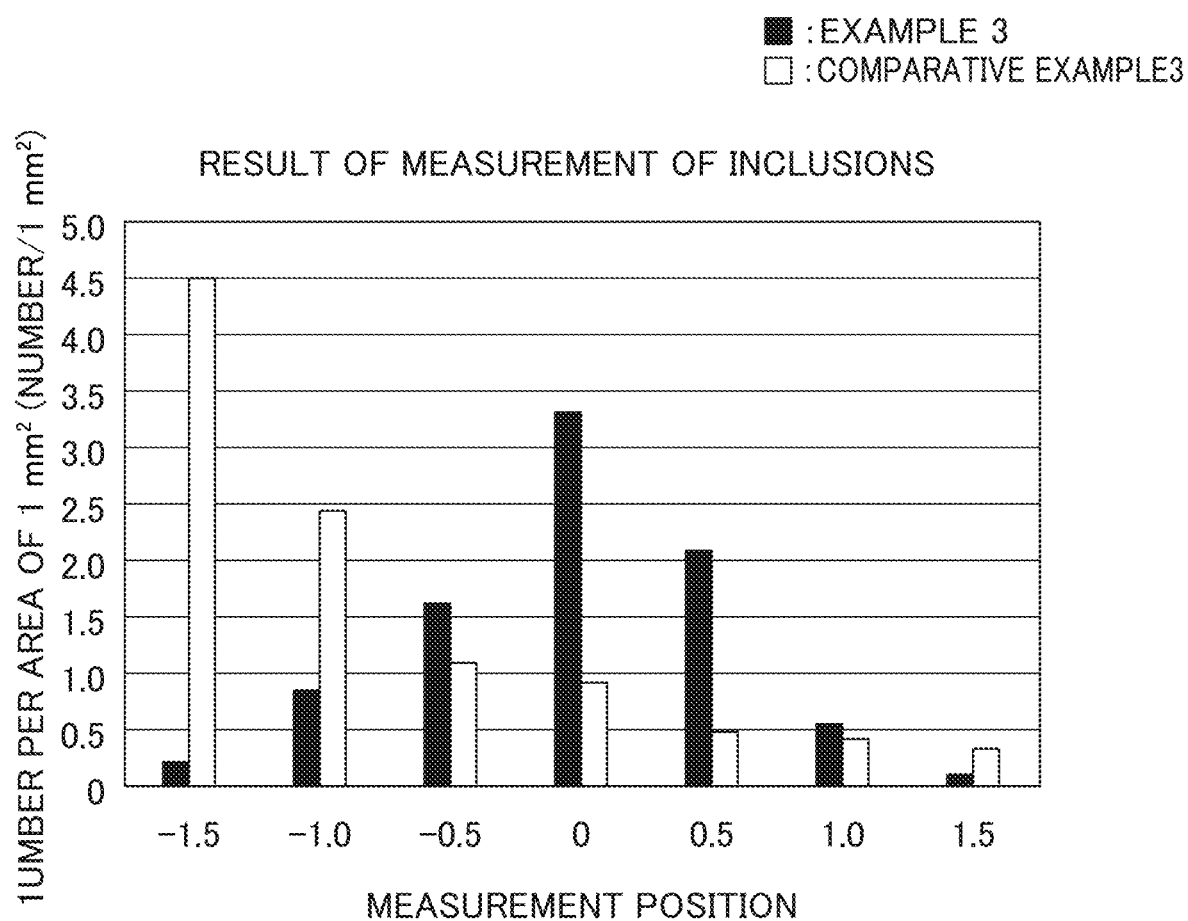
FIG. 13 illustrates results of measurement of quantities of inclusions.

Quantities of the inclusions were measured by the foregoing process. FIG. 13 illustrates the results of the measurement. Example 3 is the tubular rotary component produced by the method of the present invention. A seamless tube of SUJ2 steel (having an inside diameter of 10 mm, an outside diameter 22 mm, and a wall thickness of 6 mm) produced by the Mannesmann piercing method was cut into a piece having a length of 13 mm along an axis of the tube, thereby producing a tubular rotary component as Comparative Example 3. The tubular rotary component of Example 3 corresponds to the tubular rotary component of Example 1-1 shown in Table 3. The tubular rotary component of Example 3 and that of Comparative Example 3 were each subjected to a cutting process to have an inside diameter of 11.9 mm, an outside diameter 20.1 mm, and a height of 12.1 mm.

The results shown in FIG. 13 demonstrate that the tubular rotary component of Example 3 includes many inclusions present near the midpoint of the plate thickness, and the quantity of inclusions decreases toward the inner surface and toward the outer surface. That is, when the quantity of inclusions present in an inside diameter-side surface layer is defined as d (inside diameter) and the quantity of inclusions present at the midpoint of the plate thickness is defined as d (plate thickness midpoint), the distribution of the quantity of the inclusions in the plate thickness of the tubular rotary component satisfies a relationship expressed as d (plate thickness midpoint)>d (inside diameter). Further, when the quantity of inclusions present in an outside diameter-side surface layer is defined as d (outside diameter), the distribution of the quantity of the inclusions satisfies a relationship expressed as d (plate thickness midpoint)>d (outside diameter). On the other hand, it was confirmed that in Comparative Example 3 made of the seamless steel tube, the quantity of inclusions increases toward the inner surface while decreasing toward the outer surface.

Next, to study an effect exerted on the rolling fatigue characteristics by the residual ratio of the inside diameter-side thickness and that of the outside diameter-side thickness, test pieces having different residual ratios of the inside diameter-side and outside diameter-side thicknesses were prepared.

Rolling fatigue testers will be described with reference to FIGS. 14A and 14B.

Figure 14A:
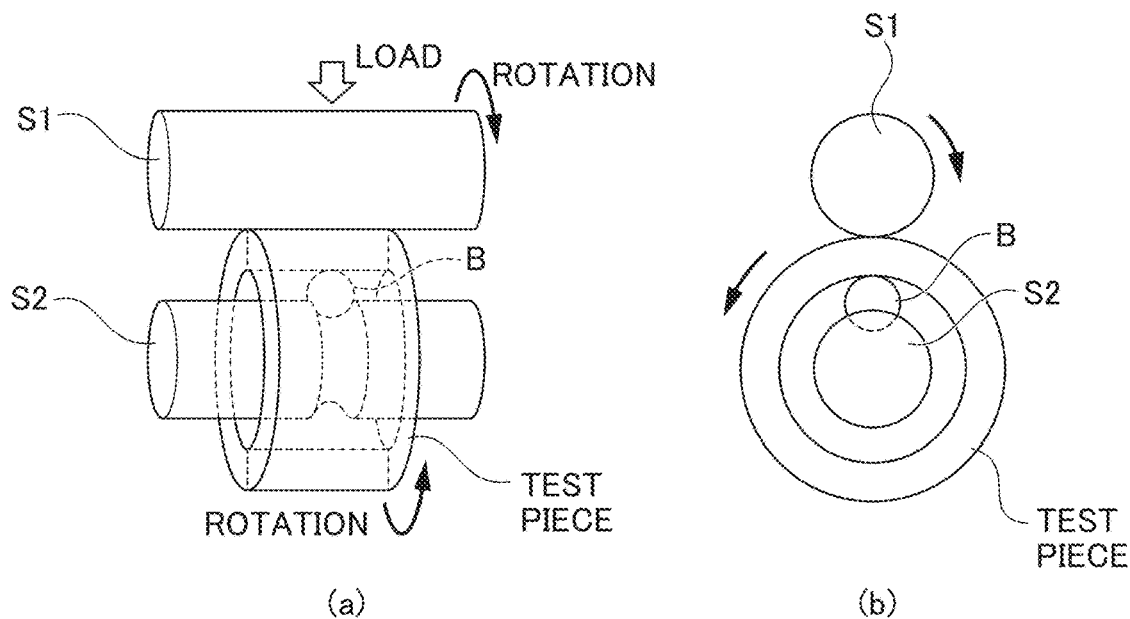
FIG. 14A schematically illustrates a configuration of a rolling fatigue tester for testing an inner surface.

FIG. 14A illustrates a rolling fatigue test for the inner surface. In this test, a shaft S1 is brought into contact with the outer surface of the test piece of the tubular rotary component, and a steel ball B is brought into contact with the inner surface of the test piece (see (a) in FIG. 14A). The steel ball B is fitted to a shaft S2 (see (b) in FIG. 14A). In the illustrated configuration, when the shaft S1 under a load is maintained in contact with the test piece while rotating in the direction indicated in FIG. 14A, the test piece is rotated and the steel ball B rolls.

Figure 14B:
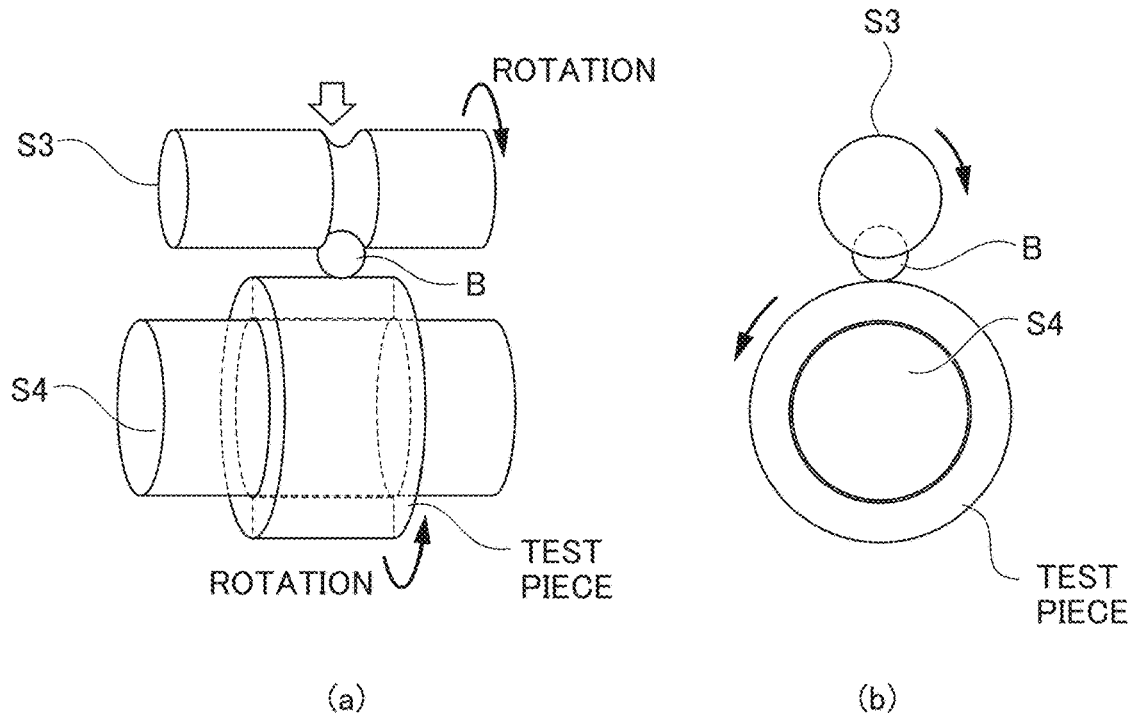
FIG. 14B schematically illustrates a configuration of a rolling fatigue tester for testing an outer surface.

FIG. 14B illustrates a rolling fatigue test for the outer surface. In this test, a shaft S4 is brought into contact with the inner surface of the test piece of the tubular rotary component, and a steel ball B is brought into contact with the outer surface of the test piece (see (a) in FIG. 14B). The steel ball B is fitted to a shaft S3 (see (b) in FIG. 14B). In the illustrated configuration, while the shaft S4 is rotated in the direction indicated in FIG. 14B, a load is applied via the shaft S3 such that the shaft S4 is brought into contact with the test piece. Consequently, the test piece is rotated and the steel ball B rolls while being in contact with the outer surface.

Tubular rotary components of Examples and Comparative Examples were produced to have different residual ratios of the inside diameter-side and outside diameter-side thicknesses. The produced tubular rotary components were subjected to heat treatment under the heat treatment conditions shown in Table 4 and a fine finishing process, whereby the following tubular rotary components were prepared: tubular rotary components of Examples 4-1 to 4-3 and Comparative Example 4 (having different residues ratio of the inside diameter-side thickness); and tubular rotary components of Examples 5-1 to 5-3, Comparative Examples 5-1 and 5-2 (having different residue ratios of the outside diameter-side thickness). The cutting process after the reaming-drawing process was performed so that a finishing allowance of 0.1 mm was left with respect to a desired shape. The fine finishing process after the heat treatment was performed to grind the tubular rotary component by about 0.1 mm, thereby achieving the desired shape.

The tubular rotary components of these Examples and Comparative Examples were subjected to rolling fatigue tests under the test conditions shown in Table 5. Table 6 shows a relationship between the residue ratio of the inside diameter-side thickness and the rolling fatigue characteristics. Table 7 shows a relationship between the residue ratio of the outside diameter-side thickness and the rolling fatigue characteristics. The tubular rotary components of Examples and Comparative Examples shown in Table 7 all have a height of 12 mm. The rolling fatigue test results are evaluated and indicated as follows.

Under the conditions shown in Table 5, a cumulative fracture probability of the tests in which n=16 was calculated. The tubular rotary component having the characteristics equivalent or superior to those of a tubular rotary component made of a seamless steel tube was evaluated as good, and is marked with circle symbol (○). The tubular rotary component having the characteristics inferior to those of the tubular rotary component made of a seamless steel tube was evaluated as poor, and is marked with cross symbol (×).

TABLE 4

|  | Hardening | Tempering |
|---|---|---|
| Temperature (° C.) | 820 | 160 |
| Time (Min.) | 30 | 60 |
| Cooling Method | Oil Cooling | Air Cooling |

TABLE 5

| Steel Ball | Made of SUJ2, φ3 |
|---|---|
| Maximum Contact Stress | 4903 N/mm$^2$ |
| Number of Revolutions | 1800 cpm |
| Lubricating Oil | Turbine #68 |
| Maximum Number of Repetitions | 10$^8$ times |
| n (number) | 16 |

TABLE 6

|  | Outside Diameter (mm) | Inside Diameter (mm) | Inside Diameter-Side Thickness (mm) | Residual Ratio of Inside Diameter-Side Thickness | Rolling Fatigue Test Result |
|---|---|---|---|---|---|
| Before Finishing Process (Example 3) | 21.5 | 9.8 | 2.925 | 1 | — |
| Example 4-1 | 20 | 11 | 2.32 | 0.79 | ○ |
| Example 4-2 | 20 | 12 | 1.82 | 0.62 | ○ |
| Example 4-3 | 20 | 13 | 1.32 | 0.45 | ○ |
| Example 4-4 | 20 | 13.5 | 1.07 | 0.37 | ○ |
| Comparative Example 4 | 20 | 14 | 0.825 | 0.28 | x |

TABLE 7

| | Outside Diameter (mm) | Inside Diameter (mm) | Outside Diameter-Side Thickness (mm) | Residual Ratio of Outside Diameter-Side Thickness | Rolling Fatigue Test Result |
|---|---|---|---|---|---|
| Before Finishing Process (Example 3) | 21.5 | 9.8 | 2.925 | 1 | — |
| Example 5-1 | 20 | 12 | 2.23 | 0.76 | ○ |
| Example 5-2 | 19 | 12 | 1.68 | 0.57 | ○ |
| Example 5-3 | 18.5 | 12 | 1.43 | 0.49 | ○ |
| Comparative Example 5-1 | 18 | 12 | 1.18 | 0.40 | x |
| Comparative Example 5-2 | 17 | 12 | 0.68 | 0.23 | x |

As shown in Table 6, in the cases of the tubular rotary components manufactured by the method including the cutting process step, if the residue ratio of the inside diameter-side thickness was equal to or greater than 0.37, good rolling fatigue characteristics were obtained. As shown in Table 7, if the residue ratio of the outside diameter-side thickness was equal to or greater than 0.49, good rolling fatigue characteristics were obtained.

Next, the following tubular rotary components were subjected to the rolling fatigue tests: the tubular rotary component of Example 4-1 (Table 6), the inside diameter side of which was subjected to the cutting process; the tubular rotary component of Example 5-1 (Table 7), the outside diameter side of which was subjected to the cutting process; and the tubular rotary component of Comparative Example 6 made from a seamless steel tube.

The tubular rotary component of Comparative Example 6 was made from a seamless tube of SUJ2 steel produced by the Mannesmann piercing method and having an outside diameter of 22 mm, an inside diameter of 10 mm, and a wall thickness of 6 mm. The seamless tube was subjected to a tube-drawing process to be formed into a shape with an outside diameter of 21.5 mm and an inside diameter of 9.8 mm. Subsequently, like Examples 4-1 and 5-1, the tubular rotary component of Comparative Example 6 underwent heat treatment and the finishing process to be formed into a shape with an outside diameter of 20 mm and an inside diameter of 12 mm. Thus, Comparative Example 6 has the residual ratio of the inside diameter-side thickness identical to that of Example 4-1, and the residual ratio of the outside diameter-side identical to that of Example 5-1.

Figure 15A:
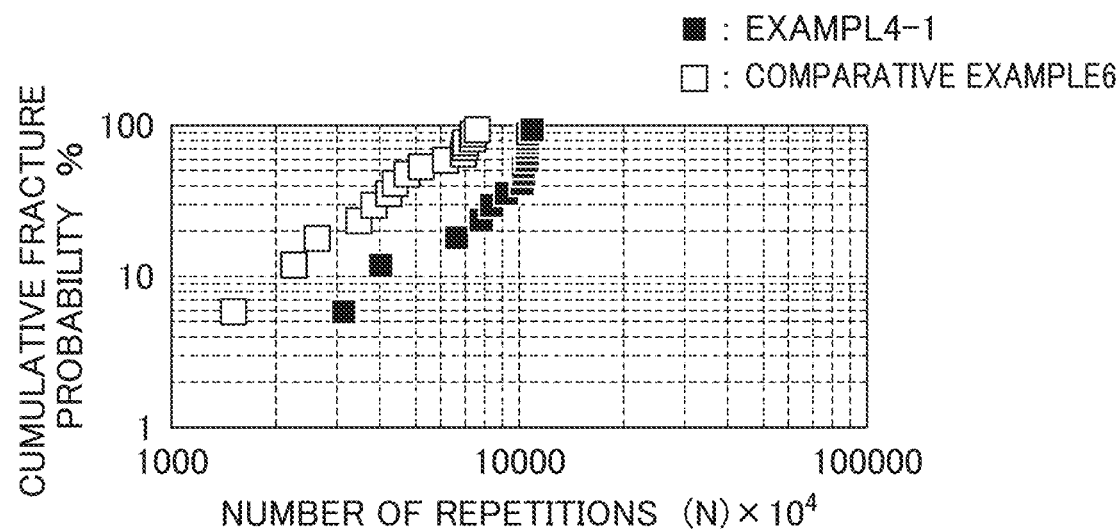
FIG. 15A illustrates results of rolling fatigue tests on the inner surface of Example 4-1 and the inner surface of Comparative Example 6 (a tubular rotary component made from a seamless tube)
Figure 15B:
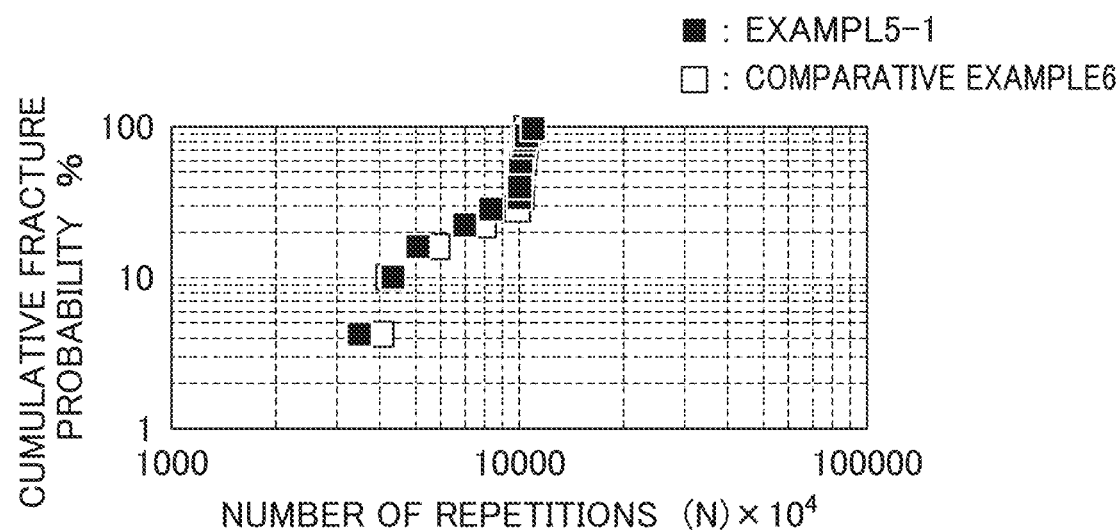
FIG. 15B illustrates results of rolling fatigue tests on the outer surface of Example 5-1 and the outer surface of Comparative Example 6 (the tubular rotary component made from the seamless tube)

The results of the rolling fatigue tests are illustrated in FIGS. 15A and 15B. FIG. 15A illustrates the results of the tests on the inner surfaces, while FIG. 15B illustrates the results of the tests on the outer surfaces.

The inner surfaces of the tubular rotary components of Examples 4-1 and 5-1 have better rolling fatigue characteristics than the inner surface of the seamless steel tube of Comparative Example 6. The outer surfaces of the tubular rotary components of Examples 4-1 and 5-1 have rolling fatigue characteristics equivalent to those of the outer surface of the seamless steel tube of Comparative Example 6.

Thus, in comparison with the case of producing a tubular rotary component from a seamless steel tube as a materiel, the manufacturing method of the present invention eliminates the need to cut off a considerable volume from the inner surface, improves material yield, and shortens time required for the cutting, thereby enabling an increase in productivity. Further, the manufacturing method of the present invention allows little difference in the rolling fatigue characteristics between the inner surface and the outer surface. Thus, the tubular rotary component of the present invention is suitable for inner and outer rings of a radial bearing.

In the foregoing, embodiments, modifications, and examples of the method for manufacturing the tubular rotary component according to the present invention have been described. However, the above-described embodiments, modifications, and examples are not intended to limit the present invention, and appropriate variations can be made to the present invention.

For example, in the above examples, the reaming-drawing process was performed once or twice. However, this is a non-limiting example. The reaming-drawing process may be performed more times, as necessary.

EXPLANATION OF REFERENCE NUMERALS 10A, 10A1, 10A2, 10B: Punch
20A, 20A1, 20A2, 20B: Die
100: Metal Disc
100A, 100A1, 100A2: Intermediate Molded Article
100B: Tubular Rotary Component

The invention claimed is:

1. A method for manufacturing a tubular rotary component from a metal disc with a hole formed in a central portion thereof, the metal disc having a predetermined inside diameter and a predetermined outside diameter, the method comprising:
an intermediate molding step comprising subjecting the metal disc to a reaming-drawing process in which both surfaces of the metal disc are pressed in entirety by a tapered surface of a punch having a predetermined taper and a tapered surface of a die having a predetermined taper, thereby producing an intermediate molded article having a frustoconical shape; and
a final molding step comprising subjecting the intermediate molded article to a further reaming-drawing process in which the intermediate molded article is pressed by a punch and a die having a smaller taper angle than the punch and the die for use in the intermediate molding step, respectively, thereby manufacturing the tubular rotary component,
wherein the final molding step is performed by inserting the punch having the smaller taper angle from a portion of the intermediate molded article having the outside diameter in a state in which a portion of the intermediate molded article having the inside diameter is positioned adjacent to the die having the smaller taper angle, and wherein in both the intermediate molding step and the final molding step, an outer peripheral portion and an inner peripheral portion of the metal plate are subjected to shrink flange deformation and stretch flange deformation, respectively.

2. The method according to claim 1,
wherein the reaming-drawing process and further reaming-drawing process are performed under a condition that a stretch flange rate $\lambda$ is 90% or less, the stretch flange rate $\lambda$ being given by $\lambda=(D_1'-D_1)/D_1 \times 100$ where $D_1'$ represents the inside diameter of the metal disc before undergoing the reaming-drawing process, and $D_1'$ represents an inside diameter of the tubular rotary component manufactured through the final molding step.

3. The method according to claim 1,
wherein in the intermediate molding step, an angle formed between the tapered surface of the punch and a processing direction and an angle formed between the tapered surface of the die and the processing direction are each set to 30 degrees or greater.

4. The method according to claim 1,
wherein in the intermediate molding step, the reaming-drawing process is performed two or more times while an angle between the tapered surface of the punch and a processing direction and an angle between the tapered surface of the die and the processing direction are varied.

5. The method according to claim 1,
wherein the metal disc is made of a metal plate, the metal plate containing inclusions that are unevenly distributed such that a quantity of the inclusions increases toward a midpoint of a plate thickness of the metal plate,
wherein the method further comprises a cutting process step comprising subjecting the tubular rotary component obtained through the final molding step to a cutting process,
wherein the tubular rotary component has a thickness in which a partial thickness from a midpoint of the thickness to an inside diameter-side surface of the tubular rotary component is defined as an inside diameter-side thickness, while a partial thickness from the midpoint of the thickness to an outside diameter-side surface of the tubular rotary component is defined as an outside diameter-side thickness, and
wherein the cutting process is performed such that an inside diameter-side residue ratio becomes 0.37 or greater and an outside diameter-side residue ratio becomes 0.49 or greater, the inside diameter-side residue ratio being a ratio of the inside diameter-side thickness after the cutting process to the inside diameter-side thickness before the cutting process, and the outside diameter-side residue ratio being a ratio of the outside diameter-side thickness after the cutting process to the outside diameter-side thickness before the cutting process.

6. The method according to claim 5, further comprising a heat treatment step comprising subjecting the tubular rotary component obtained through the final molding step to hardening and tempering.

\* \* \* \* \*